(12) United States Patent
Chen et al.

(10) Patent No.: US 7,997,513 B2
(45) Date of Patent: Aug. 16, 2011

(54) OSCILLATING FAUCET STRUCTURE OF A DUAL-OUTLET SYSTEM

(76) Inventors: Jui-Chien Chen, Lugang Township, Changhua County (TW); Jui-Ching Chen, Lugang Township, Changhua County (TW)

( * ) Notice: Subject to any disclaimer, the term of this patent is extended or adjusted under 35 U.S.C. 154(b) by 972 days.

(21) Appl. No.: 11/873,983

(22) Filed: Oct. 17, 2007

(65) Prior Publication Data

US 2009/0100594 A1 Apr. 23, 2009

(51) Int. Cl.
*B05B 3/00* (2006.01)
(52) U.S. Cl. .................................. 239/243; 239/262
(58) Field of Classification Search ............... 239/225.1, 239/242, 243, 237, 249, 255, 262, 263; 4/678
See application file for complete search history.

(56) References Cited

U.S. PATENT DOCUMENTS

| | | | | |
|---|---|---|---|---|
| 3,391,701 A | * | 7/1968 | Richardson et al. | 134/123 |
| 4,231,239 A | * | 11/1980 | Lazaroff | 68/205 R |
| 4,671,462 A | * | 6/1987 | Badria | 239/227 |
| 7,246,756 B2 | * | 7/2007 | DeWitt | 239/227 |

* cited by examiner

*Primary Examiner* — Davis Hwu (57) ABSTRACT

The present invention provides an oscillating faucet structure of a dual-outlet system to improve the shortcomings of a typical faucet of a dual-outlet system. The faucet structure includes a main body, seat post and combined footstock. A hollow groove is assembled within the seat post at top of the main body and used to accommodate the first and second water regulators. The main body has first and oscillating outlet heads, which can freely oscillate for flexible regulation. The combined footstock is assembled on top of the seat post of main body for mounting the second oscillating outlet head, thus enabling easy removal, repair or replacement of defective components with improved applicability.

8 Claims, 11 Drawing Sheets

OSCILLATING FAUCET STRUCTURE OF A DUAL-OUTLET SYSTEM

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates generally to a faucet, and more particularly to an innovative faucet with a dual-outlet system for oscillating regulation.

2. Description of Related Art Including Information Disclosed Under 37 CFR 1.97 and 37 CFR 1.98.

A variety of faucet structures have been developed so far, such as faucets on cooking tables that are mostly designed with a single outlet. However, cooking tables for many users are currently equipped with water filters (e.g. water purifiers) for convenient operation, making it difficult to provide an orderly and aesthetically-pleasing environment. For this reason, an improved faucet for a dual-outlet system has been developed. The feature is that a dual-outlet tube in the faucet structure is linked separately to the pipelines of both a tap water system and a water filter. Thus, the tap water system and water purifier are combined into the same faucet structure.

As for the typical faucet structure of the dual-outlet system, the pipelines of both the tap water system and water filter are assembled into the same outlet tube of the faucet, and the control switches of tap water and purified water are assembled at both sides of the faucet.

However, there are shortcomings are observed during actual application.

First, the outlet of purified water is limited to the same outflow position as the tap water, leading to inconvenient and inflexible operation.

Second, the outlets of new water filters are designed with multiple water supply modes (e.g. cold water, hot water and bubbled water), so the aforementioned design of a typical structure will make it difficult to accommodate several pipelines in a single space and to assemble the switching mechanism easily.

Third, in case of damage of any outlet system of the typical faucet structure, maintenance or replacement is inconvenient since the possibility of replacement is not taken into consideration in overall structural design.

Thus, to overcome the aforementioned problems of the prior art, it would be an advancement in the art to provide an improved structure that can significantly improve efficacy.

Therefore, the inventor has provided the present invention of practicability after deliberate design and evaluation based on years of experience in the production, development and design of related products.

BRIEF SUMMARY OF THE INVENTION

There is enhanced efficacy of the present invention.

Figure 6:
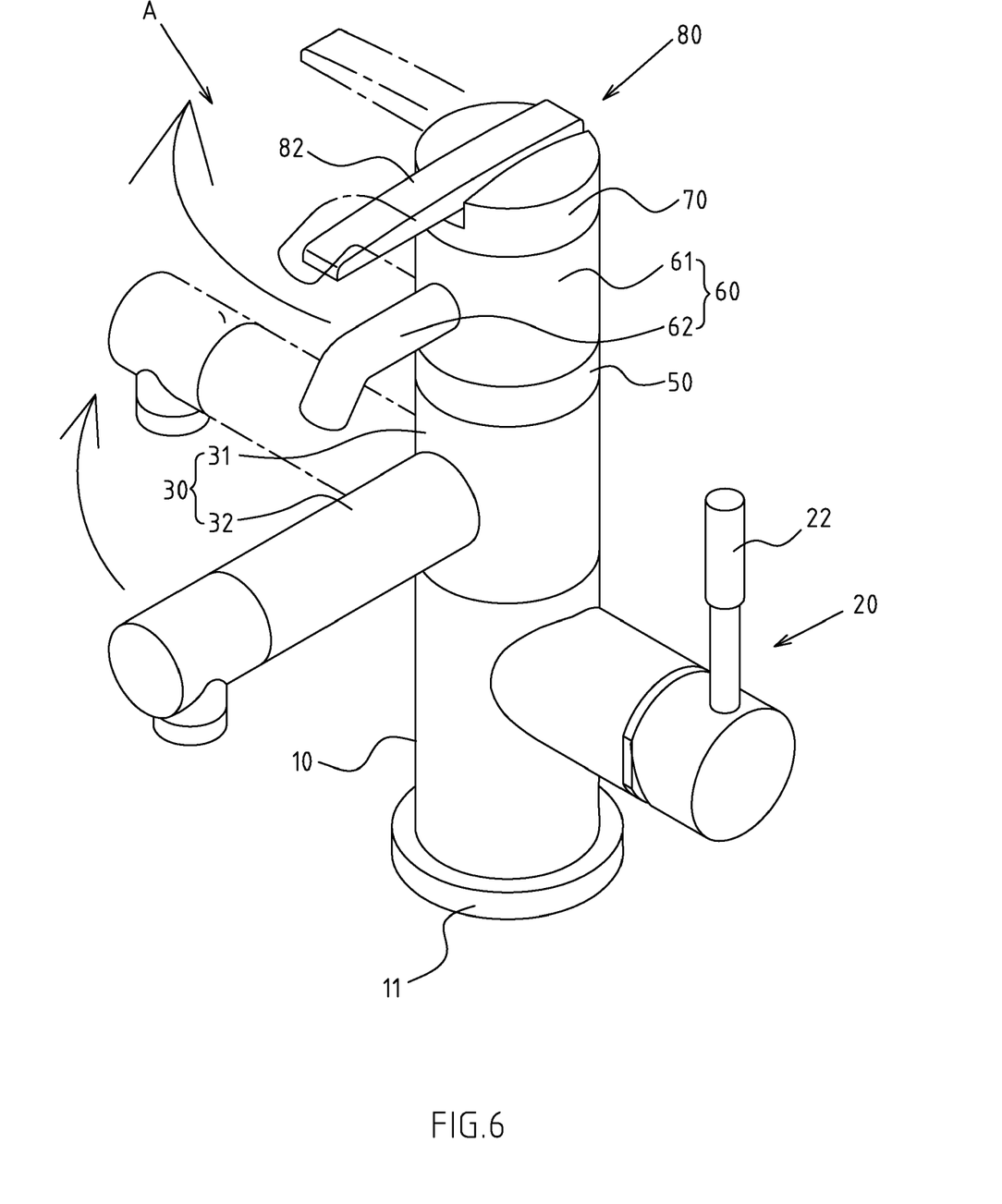
FIG. 6 shows a schematic view of the application of the present invention.

Referring to FIG. 6, the faucet A of the dual-outlet system is provided with the first and second oscillating outlet heads 30, 60 in a freely oscillating state, so the users are allowed to adjust freely the angle for more flexible and convenient operation.

Figure 1:
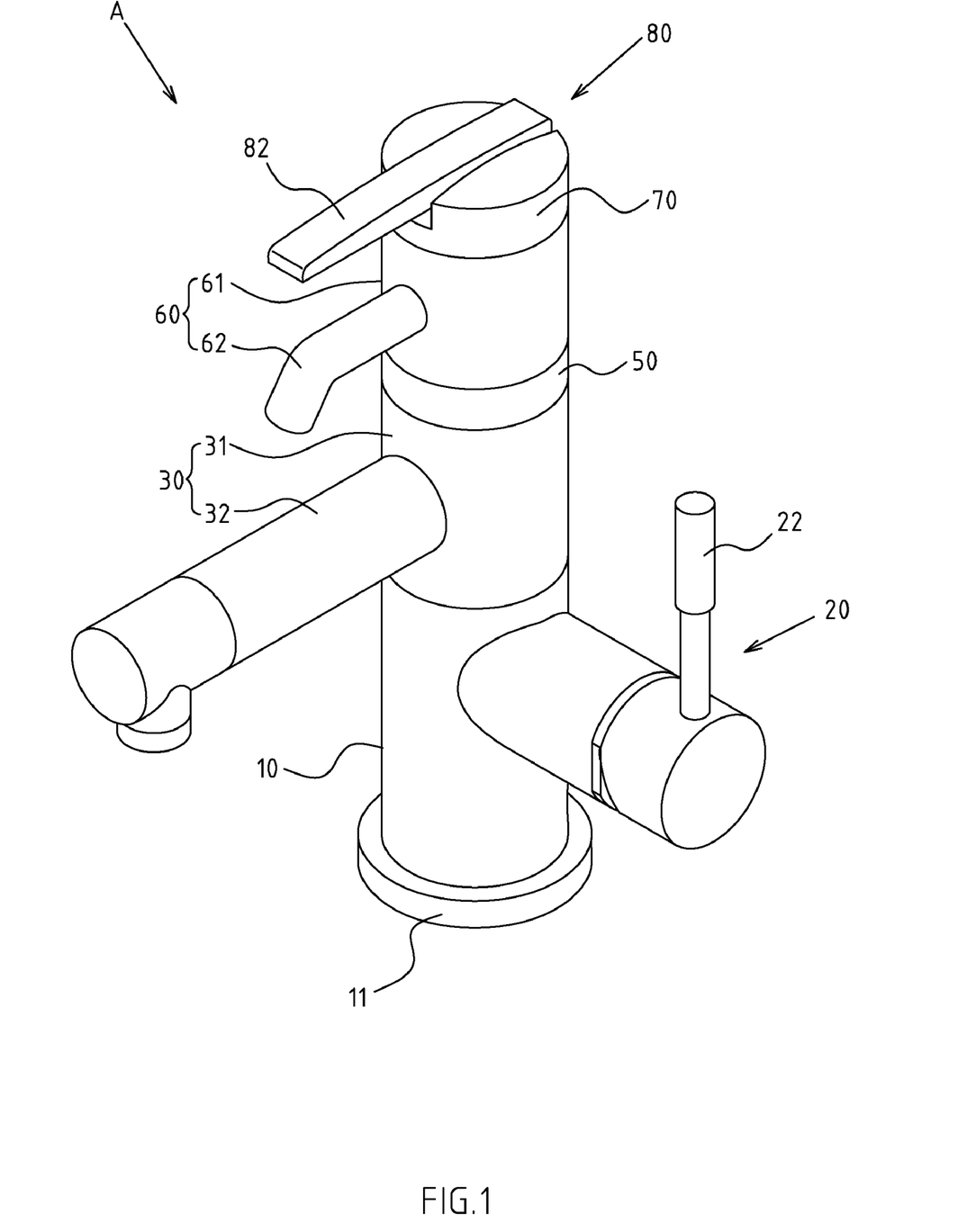
FIG. 1 shows an assembled perspective view of the present invention.
Figure 2:
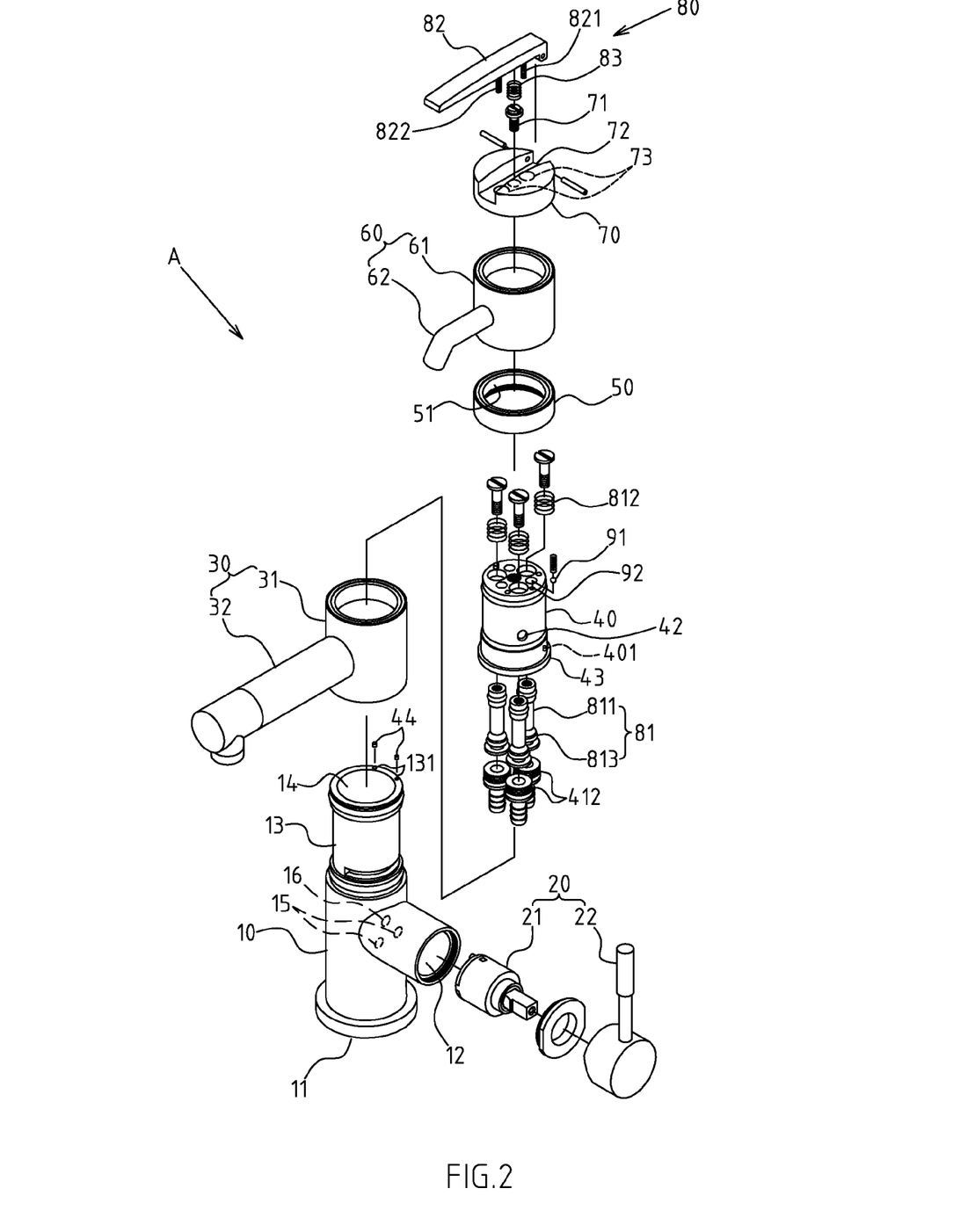
FIG. 2 shows an exploded perspective view of the present invention.
Figure 3:
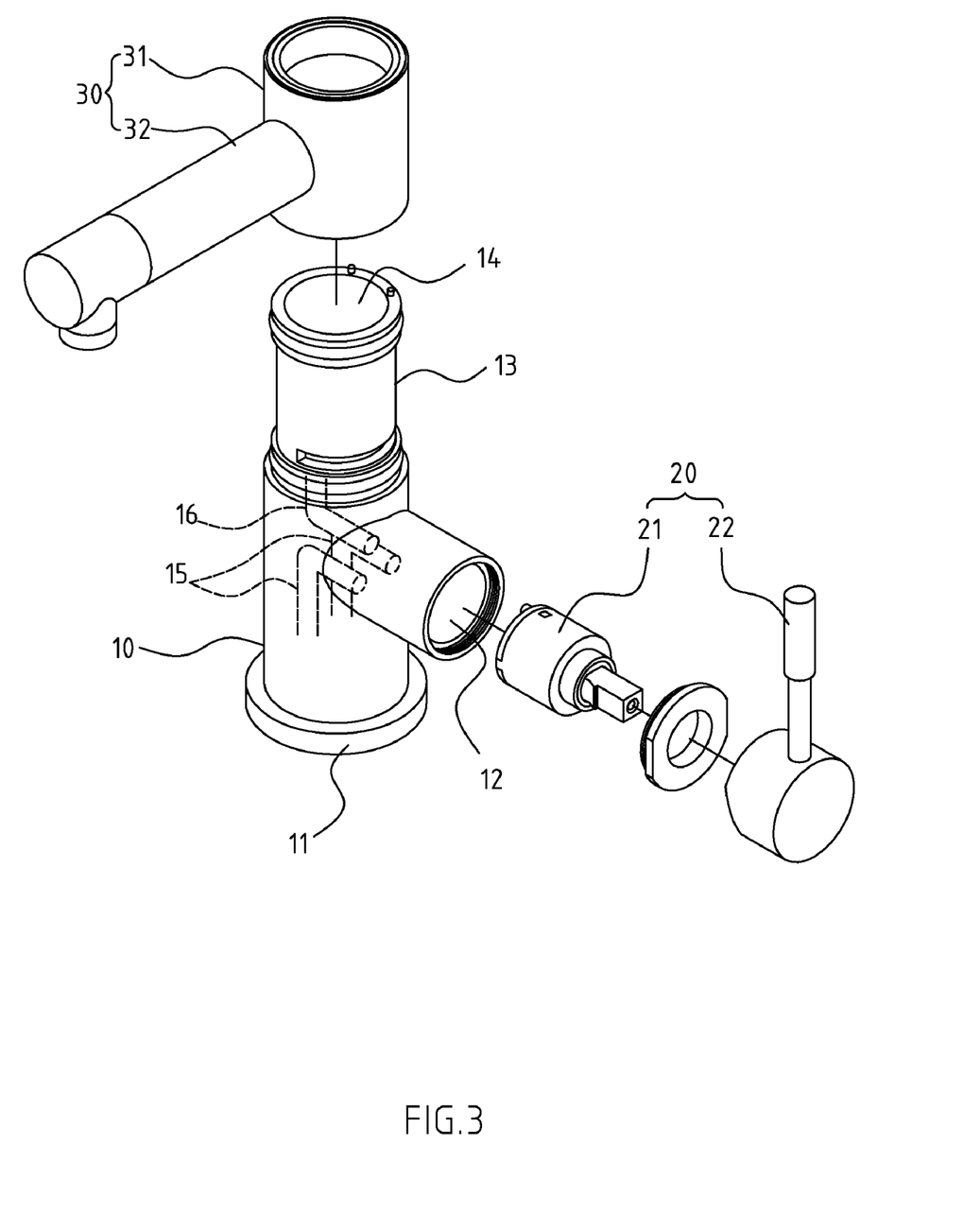
FIG. 3 shows a partially exploded perspective view of the present invention.
Figure 4:
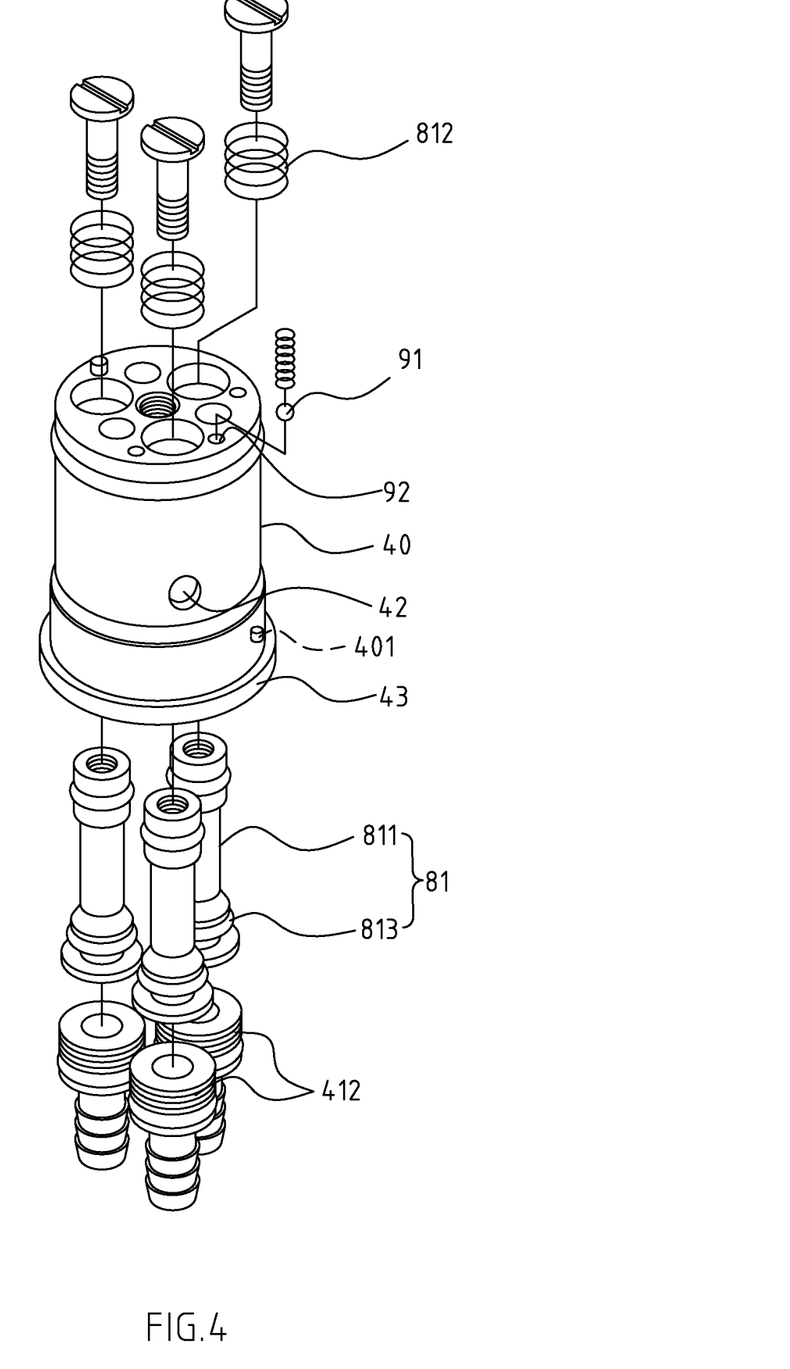
FIG. 4 shows another partially exploded perspective view of the present invention.
Figure 5:
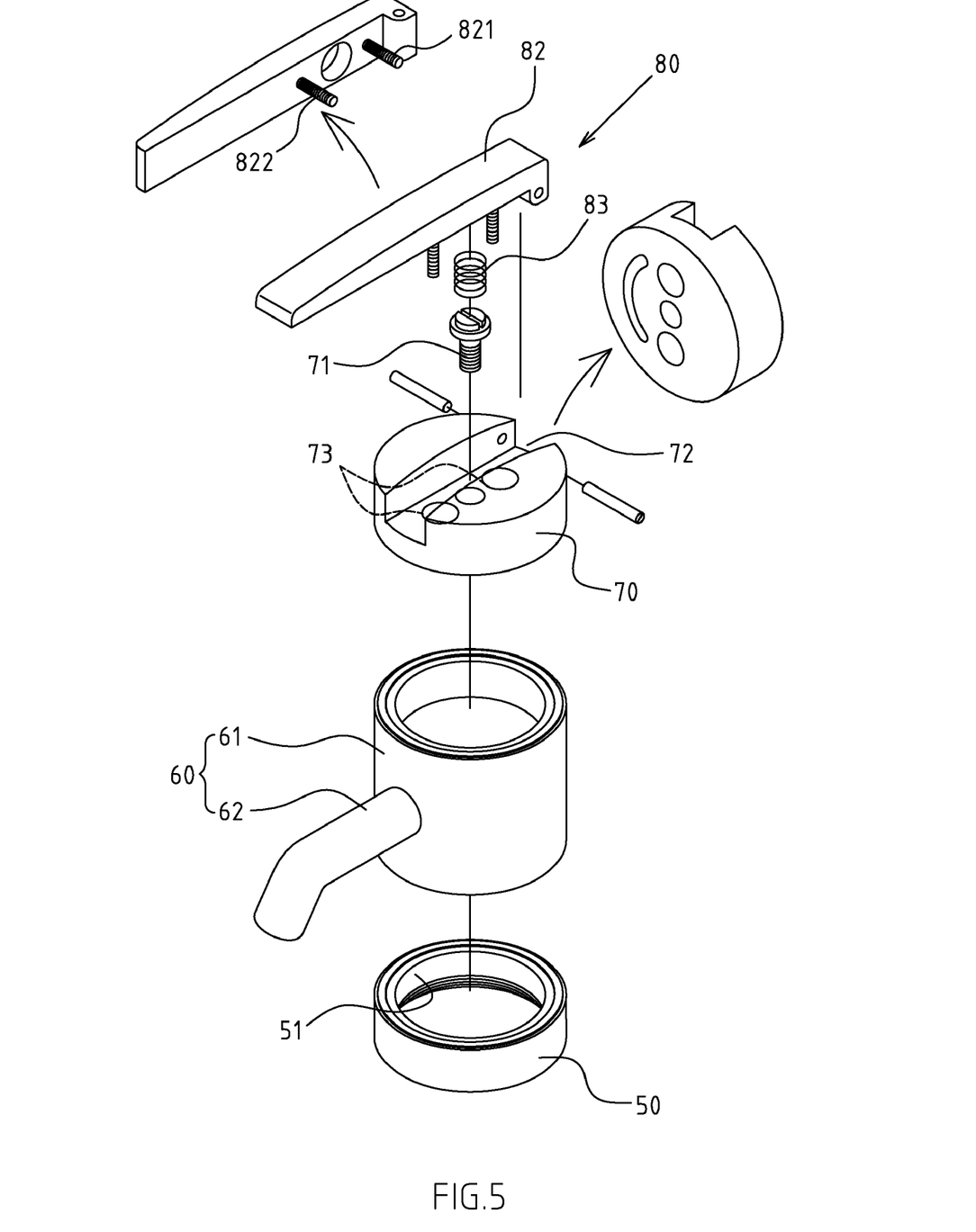
FIG. 5 shows the third partially exploded perspective view of the present invention.
Figure 7:
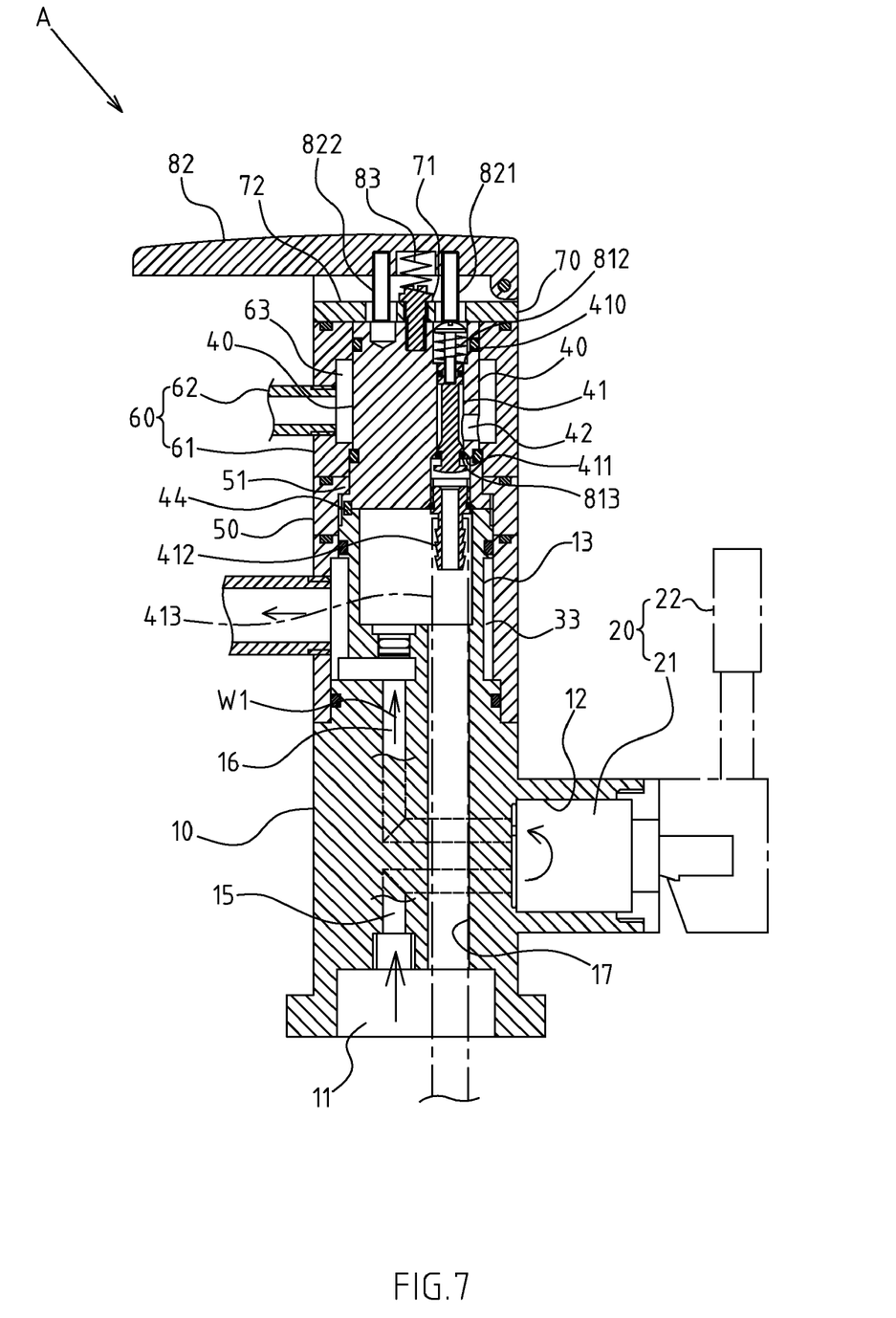
FIG. 7 shows an assembled sectional view of the present invention.

Referring to FIGS. 2 and 7, the seat post 13 at a top of the main body 10 is provided with hollow groove 14, and the main body 10 is provided with through-hole 17 for the penetration of pipeline 413. The second outflow pipeline 413, corresponding to the second oscillating outlet head 60, may have a bigger accommodating space to meet the functional requirements of new water filters with multiple water supply modes (e.g. cold, hot water and bubbled water).

Also, the combined footstock 40 is assembled on a top of the seat post 13 of the main body 10 for mounting the second oscillating outlet head 60. Thus, it is possible to remove, repair or replace the main body 10 easily in the event of damage to the second oscillating outlet head 60 and second water regulator 80.

Although the invention has been explained in relation to its preferred embodiment, it is to be understood that many other possible modifications and variations can be made without departing from the spirit and scope of the invention as hereinafter claimed.

DETAILED DESCRIPTION OF THE INVENTION

The features and the advantages of the present invention will be more readily understood upon a thoughtful deliberation of the following detailed description of a preferred embodiment of the present invention with reference to the accompanying drawings.

FIGS. 1-14 depict preferred embodiments of oscillating faucet structure of a dual-outlet system of the present invention. The embodiments are provided only for explanatory purposes. The scope of the invention is set by the patent claims.

Faucet A comprises a main body 10, with an inlet port 11 at a bottom thereof, a valve spool 12 at one side thereof, and a seat post 13 at top thereof. There is also a hollow groove 14 assembled within the seat post 13. The main body 10 is also provided with inlet passage 15 linking the inlet port 11 and valve spool 12, and the main body 10 is also provided with outlet passage 16 linking the valve spool 12 and seat post 13. The main body 10 is fitted with a through-hole 17 penetrating its top and bottom.

The invention includes a first water regulator 20, which comprises a valve core 21 and a first control switch 22. The valve core 21 is assembled into valve spool 12 of the main body 10, and the control switch 22 is assembled externally onto the valve spool 12 for control of the valve core 21.

A first oscillating outlet head 30 has a bushing portion 31 for sleeving externally onto the seat post 13 of the main body 10. A first outflow tube 32 is laterally assembled onto one side of the bushing portion 31. First water-crossing spaces 33 arranged alternatively are formed between the bushing portion 31 and seat post 13.

A combined footstock 40 is assembled on a top of seat post 13 of the main body 10. The combined footstock 40 is linked to the seat post 13 via a localizer 44 (e.g. a positioning spigot). The combined footstock 40 is designed with accommodating hole 41 penetrating it vertically. The bottom of said accommodating hole 41 aligns with the hollow groove 14 of seat post 13. The accommodating hole 41 is connected to the outer wall of combined footstock 40 via water-crossing hole 42.

A positioning backing ring 50 is assembled between the combined footstock 40 and seat post 13 of the main body 10, enabling positioning of the combined footstock 40. The bottom of the positioning backing ring 50 allows for secure pressing the first oscillating outlet head 30.

A second oscillating outlet head 60 has a bushing portion 61 for sleeving externally onto the combined footstock 40. A second outflow tube 62 is laterally assembled onto one side of the bushing portion 61. Second water-crossing spaces 63 arranged alternatively are formed between the bushing portion 61 and combined footstock 40.

A limiting cover 70 is assembled at top of the combined footstock 40. The bottom of the limiting cover 70 is used to press securely the second oscillating outlet head 60.

A second water regulator 80 comprises a water control valve 81 and a second control switch 82. The water control valve 81 is assembled into accommodating hole 41 of the combined footstock 40, and the second control switch 82 is assembled onto the limiting cover 70 for the water control valve 81.

The localizer 44 is a positioning spigot. The recessed holes 131, 401 are provided on the top of seat post 13 of the main body 10 and the bottom of combined footstock 40 for assembly of said localizer 44.

O-ring seals are arranged between the positioning backing ring 50 and bushing portion 31, 61 of first and second oscillating outlet heads 30, 60, or between the limiting cover 70 and bushing portion 61 of the second oscillating outlet head 60.

The positioning backing ring 50 is screwed securely on top of the seat post 13 of the main body 10. The positioning backing ring 50 is provided with a rebated portion 51, so that a circular flange 43 formed at bottom of the combined footstock 40 is limited by the rebated portion 51.

The water control valve 81 of second water regulator 80 comprises several valve levers 811, at top of which a spring 812 is provided to support normally the valve lever 811. At bottom of which, a water-stop portion 813 is assembled. Thus, accommodating holes 41 are arranged uniformly on the combined footstock 40, and a shoulder 410 is formed on top of the accommodating hole 41 for coupling with the spring 812. An expanded flange 411 is assembled on the bottom of the accommodating hole 41 for coupling with the water-stop portion 813. The second control switch 82 is a switch knob, at bottom of which a brake rod 821 is assembled (shown in FIG. 5). So, the center of limiting cover 70 is screwed via a pivot bolt 71 onto the combined footstock 40 in a rotary state. The limiting cover 70 is provided with a recess 72 for assembly of the second control switch 82. The limiting cover 70 is fitted with a through-hole 73 enabling the brake rod 821 to be mated with the top of valve lever 811. A flexible member 83 is arranged between the recess 72 and second control switch 82 to support flexibly the second control switch 82.

At the bottom of the second control switch 82, there is a gag lever post 822 positioned at an interval with the brake rod 821.

Flexible beads 91 and spaced positioning slots 92 are assembled correspondingly onto the combined footstock 40 and limiting cover 70, so that the rotating state of limiting cover 70 can be sectionally positioned.

Referring to FIG. 7, at the bottom of accommodating hole 41 of the combined footstock 40, a pipe joint 412 is assembled for coupling with the pipeline 413. The bottom of said pipeline 413 penetrates downwards the hollow groove 14 within seat post 13 of the main body 10, while the through-hole 17 of the main body 10 is extended outside of the main body 10.

Based upon above-specified structures, the present invention is operated.

Figure 8:
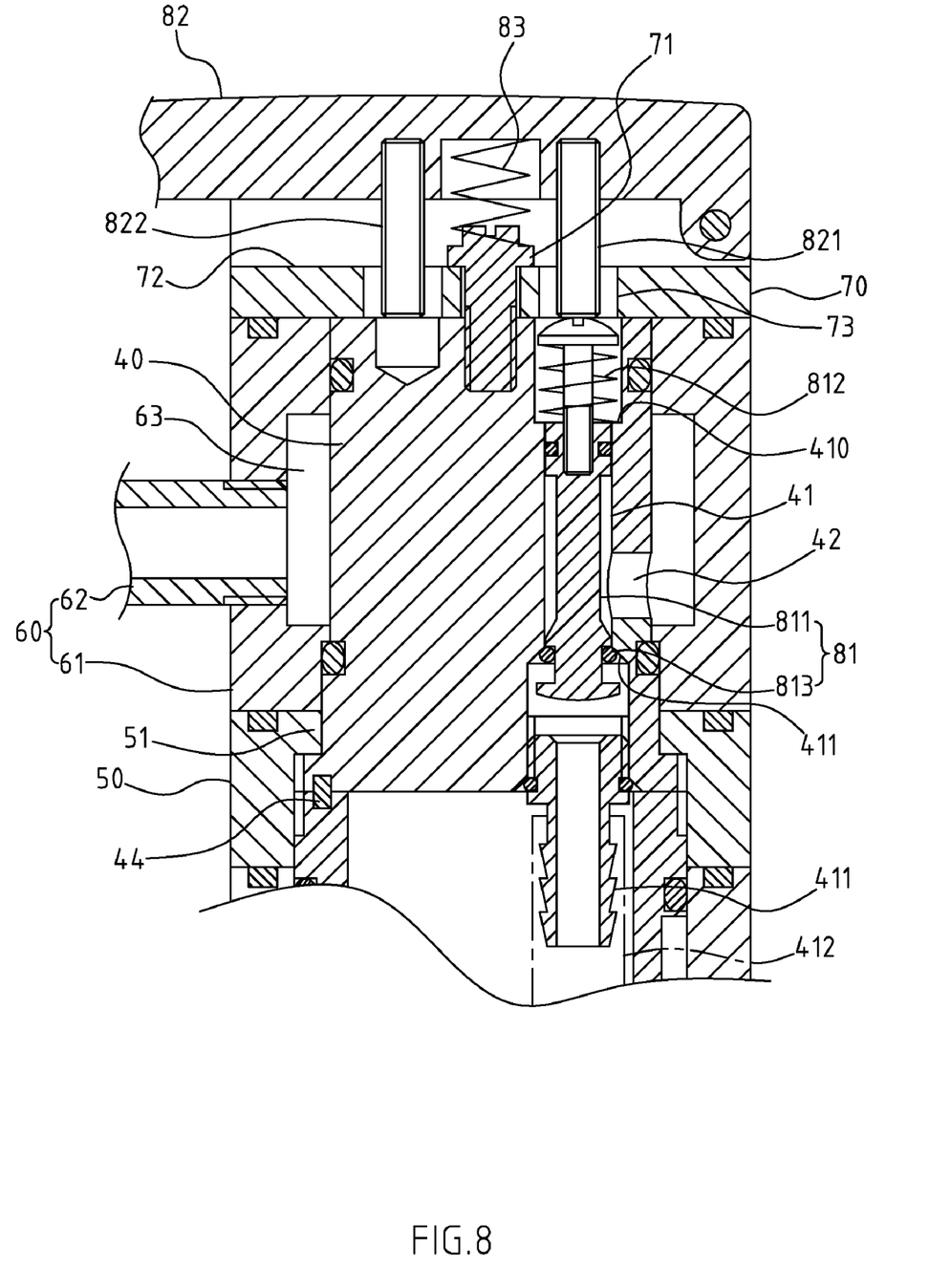
FIG. 8 shows a partially enlarged sectional view of FIG. 7.
Figure 9:
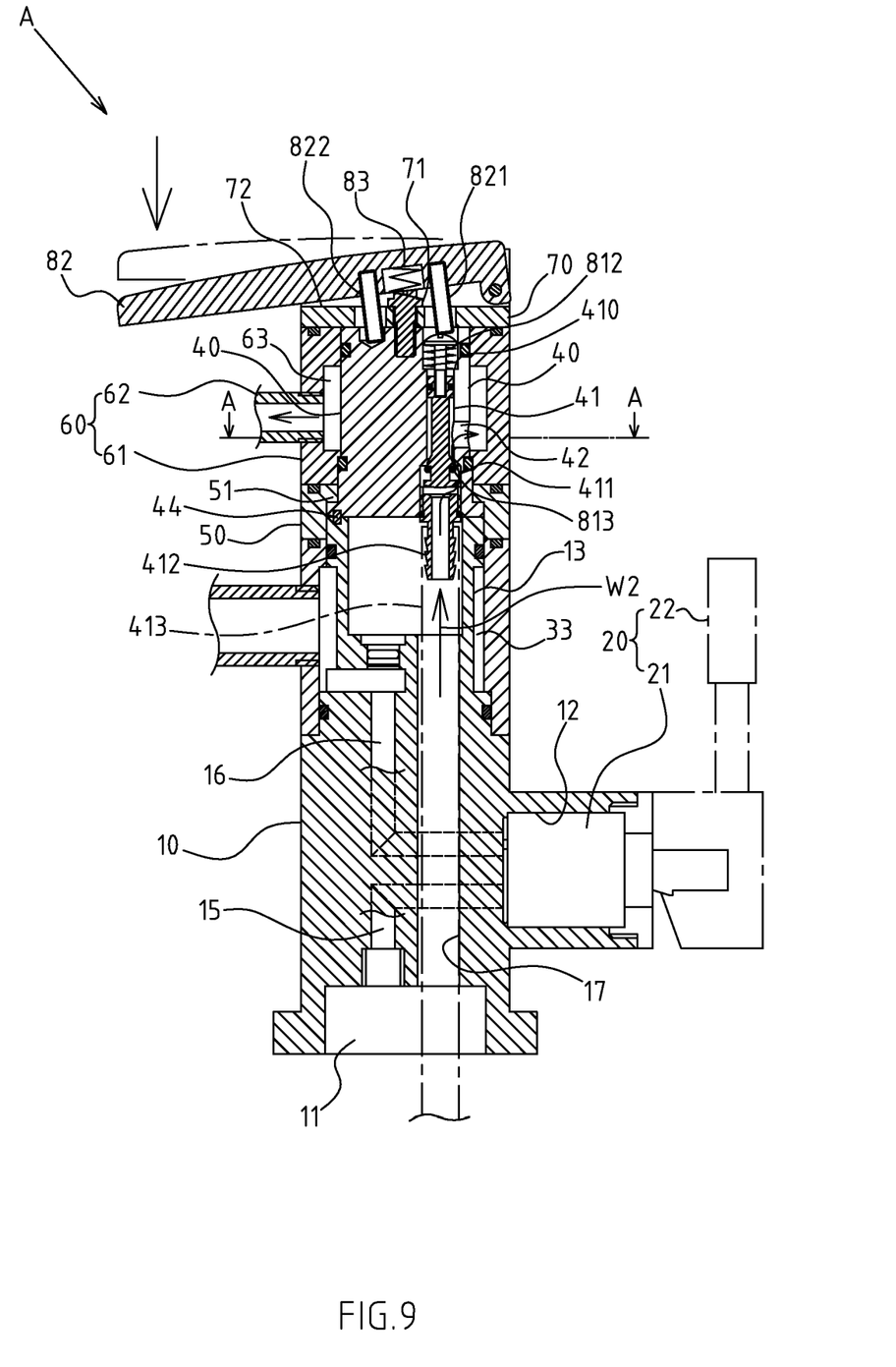
FIG. 9 shows a sectional view of second control switch of the present invention in an operational state.
Figure 10:
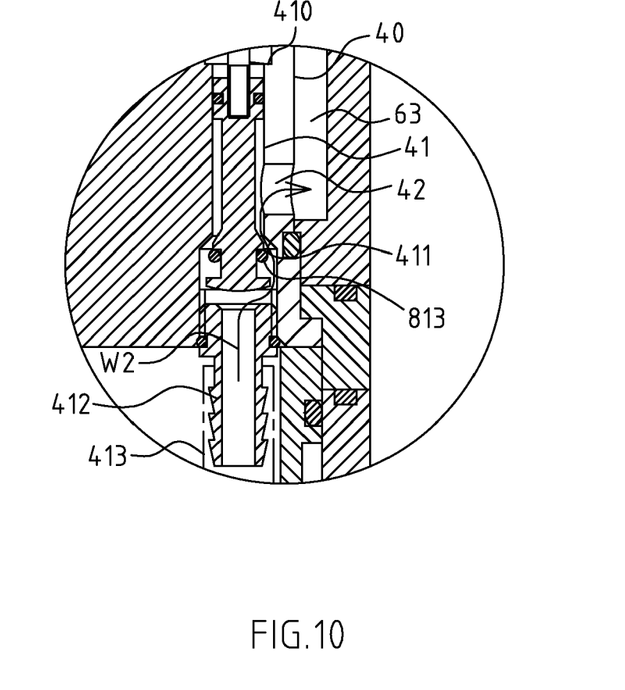
FIG. 10 shows a partially enlarged sectional view of FIG. 9.
Figure 11:
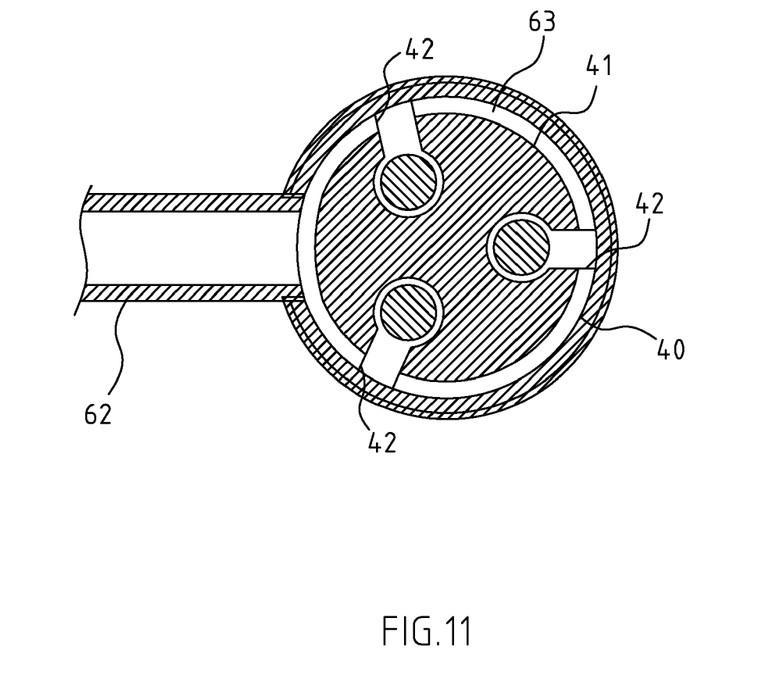
FIG. 11 shows a cross-sectional view along line A-A of FIG. 9.

Referring to FIGS. 6-8, said first oscillating outlet head 30 has an oscillating state. If water supply is normally required, the control switch 22 is turned to control the valve core 21 in the valve spool 12, thus providing waterflow W1 (e.g. cold, hot water) within the outlet passage 16 in a controlled manner. The waterflow W1 enters from inlet port 11 to the inlet passage 15, then from outlet passage 16 to the first water-crossing space 33 and finally to the first oscillating outlet head 30.

Referring to FIGS. 8-11, when purified water is to be used, the second control switch 82 is pressed to obliquely hold down the brake rod 821 and gag lever post 822 at bottom of the second control switch 82. In such a case, the brake rod 821 presses the top of the valve lever 811, so that the valve lever 811 shifts downwards, and a flow passage is formed between the water-stop portion 813 and expanded flange 411 at bottom of accommodating hole 41. So, waterflow W2 enters through pipeline 413 to the water-crossing hole 42 on the wall of the accommodating hole 41, then into the second water-crossing space 63 and finally to the second outflow tube 62.

Figures 12, 13, 14:
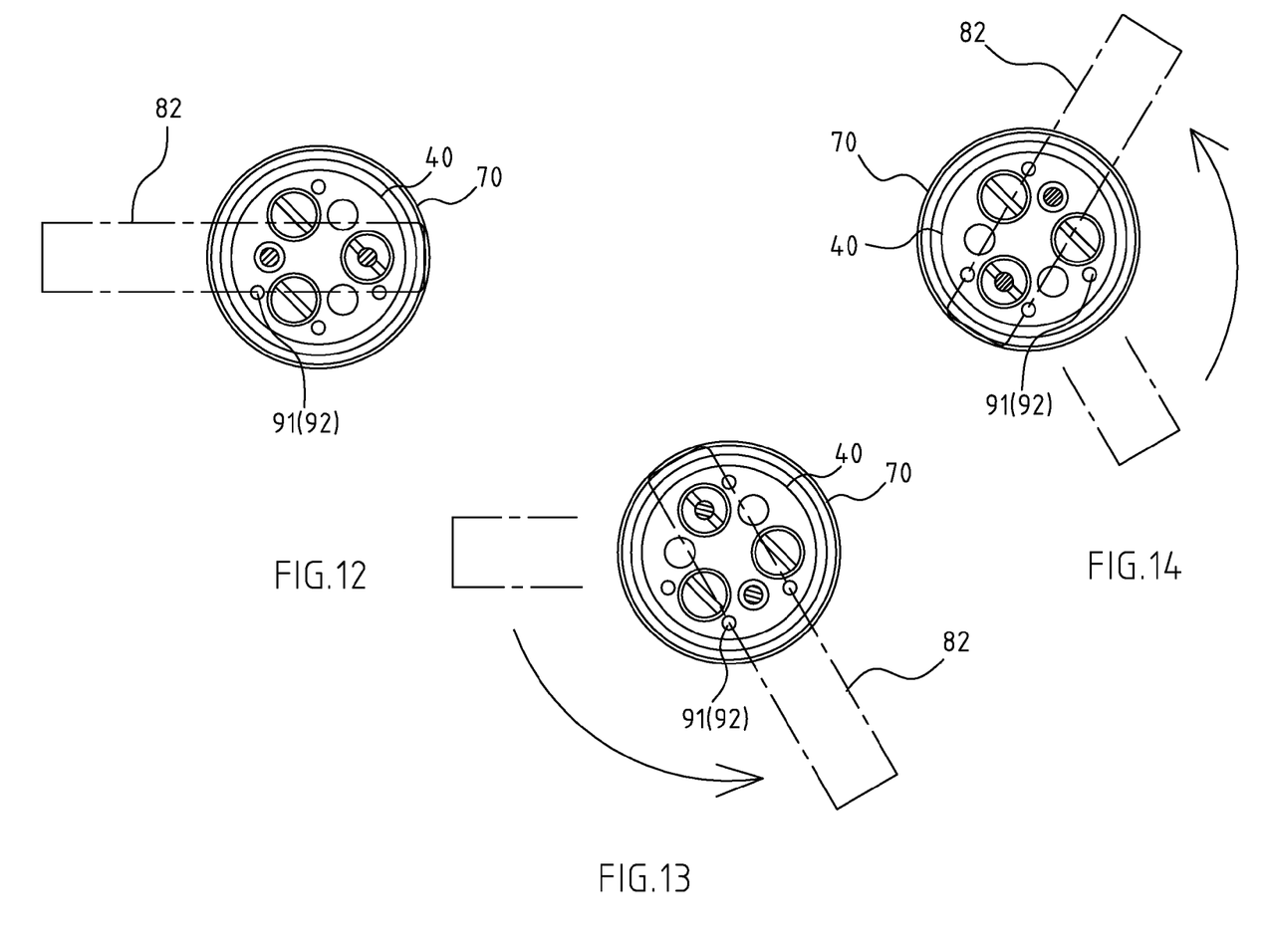
FIG. 12 shows a schematic view of the second control switch of the present invention in mode 1.
FIG. 13 shows a schematic view of the second control switch of the present invention in mode 2.
FIG. 14 shows a schematic view of the second control switch of the present invention in mode 3.

Referring also to FIGS. 12-14, when the outflow mode of purified water is to be regulated (e.g. cold, hot water and bubble water), the limiting cover 70 is turned to a preset angle with the help of flexible beads 91 and spaced positioning slots 92 assembled correspondingly onto the combined footstock 40 and limiting cover 70. The flexible beads 91 are embedded into the positioning slot 92, so that the rotating state of limiting cover 70 can be sectionally positioned.

We claim:

1. An oscillating faucet structure of a dual-outlet system, said faucet structure comprising:

a main body, having an inlet port at a bottom thereof, a valve spool at one side thereof, and a seat post at a top, thereof, said seat post having a hollow groove assembled within said seat post, said main body being provided with an inlet passage linking said inlet port and said valve spool, and an outlet passage linking said valve spool and said seat post, said main body being fitted with a through-hole penetrating said top and said bottom thereof;

a first water regulator, comprising a valve core and a first control switch, said valve core being assembled into said valve spool of said main body, said first control switch being assembled externally onto said valve spool controlling said valve core;

a first oscillating outlet head, comprising a bushing portion for sleeving externally onto said seat post of said main body, said bushing portion having one side with a first outflow tube laterally assembled thereon and having a first water-crossing spaces arranged alternatively and formed between said bushing portion and said seat post;

a combined footstock, being assembled on a top of said seat post of said main body and linked to said seat post via a localizer, said combined footstock having an accommodating hole vertically penetrating said combined footstock, a bottom of said accommodating hole being aligned with said hollow groove of said seat post said accommodating hole being connected to an outer wall of said combined footstock via said water-crossing hole;

a positioning backing ring, being assembled between said combined footstock and said seat post of said main body, enabling positioning of said combined footstock, a bottom of said positioning backing ring being securely pressed against said first oscillating outlet head;

a second oscillating outlet head, having a bushing portion for sleeving externally onto said combined footstock, said bushing portion for sleeving having a second outflow tube laterally assembled onto one side of the bushing portion, said second water-crossing spaces arranged alternatively being formed between the bushing portion and said combined footstock;

a limiting cover, being assembled at a top of said combined footstock, a bottom of said limiting cover being used to press securely said second oscillating outlet head; and a second water regulator, comprising a water control valve and a second control switch, said water control valve being assembled into said accommodating hole of said combined footstock, said second control switch being assembled onto said limiting cover for said water control valve.

2. The oscillating faucet structure defined in claim 1, wherein said localizer is a positioning spigot said top of said seat post of said main body and said bottom of said combined footstock for assembly of said localizer having recessed holes.

3. The oscillating faucet structure defined in claim 1, wherein said positioning backing ring and said bushing portion of first and second oscillating outlet heads; have O-ring seals therebetween, or said limiting cover and said bushing portion of said second oscillating outlet head have O-ring seals therebetween.

4. The oscillating faucet structure defined in claim 1, wherein said positioning backing ring is screwed securely on top of said seat post of the said main body, said positioning backing ring being provided with a rebated portion, so that a circular flange formed at a bottom of said combined footstock is limited by the said rebated portion.

5. The oscillating faucet structure defined in claim 1, wherein said water control valve of said second water regulator comprises a plurality of valve levers, said water control valve having a top with a spring provided to support a valve lever and a bottom with a water-stop portion assembled thereon, said accommodating holes being arranged uniformly on said combined footstock, and an accommodating hole having a shoulder is formed on a top of the said accommodating hole coupled with said spring, said accommodating holes having an expanded flange assembled on a bottom thereof, said expanded flange being coupled with said water-stop portion, said second control switch being a switch knob; having a bottom with a brake rod assembled thereon, said limiting cover having a center screwed via a pivot bolt onto said combined footstock in a rotary state, said limiting cover being provided with a recess for assembly of said second control switch, said limiting cover being fitted with a through-hole enabling said brake rod to be mated with said top of the valve lever, a flexible member being arranged between the recess and second control switch flexibly supporting said second control switch.

6. The oscillating faucet structure defined in claim 5, further comprising:
   flexible beads and spaced positioning slots assembled correspondingly onto said combined footstock and limiting cover, a rotating state of said limiting cover being sectionally positioned.

7. The oscillating faucet structure defined in claim 5, wherein said bottom of said second control switch comprises a gag lever post, being positioned at an interval with said brake rod.

8. The oscillating faucet structure defined in claim 1, further comprising:
   a pipe joint assembled at said bottom of said accommodating hole of said combined footstock coupling with a pipeline said pipeline having a bottom penetrating downwards said hollow groove within said seat post of said main body, a through-hole of said main body is being extended outside of said main body.

* * * * *